(12) United States Patent
Shishido (10) Patent No.: US 8,998,426 B2
(45) Date of Patent: Apr. 7, 2015

(54) PROJECTION SYSTEM

(71) Applicant: Seiko Epson Corporation, Tokyo (JP)

(72) Inventor: Yoichi Shishido, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 145 days.

(21) Appl. No.: 13/940,692

(22) Filed: Jul. 12, 2013

(65) Prior Publication Data

US 2014/0036236 A1 Feb. 6, 2014

(30) Foreign Application Priority Data

Aug. 2, 2012 (JP) ................................. 2012-171744

(51) Int. Cl.
| | |
|---|---|
| *G03B 21/14* | (2006.01) |
| *G03B 33/08* | (2006.01) |
| *G03B 21/16* | (2006.01) |
| *H04N 9/31* | (2006.01) |
| *G03B 21/20* | (2006.01) |

(52) U.S. Cl.
CPC .............. *G03B 21/142* (2013.01); *G03B 21/16* (2013.01); *H04N 9/3197* (2013.01); *G03B 21/204* (2013.01); *H04N 9/3194* (2013.01); *G03B 33/08* (2013.01)

(58) Field of Classification Search
CPC ...... G03B 21/00; G03B 21/14; G03B 21/204; H04N 9/3194; H04N 9/3197
USPC ......... 353/31, 38, 69, 84, 85, 101; 348/223.1, 348/241, 743–747, E09.051; 362/84, 232, 362/235, 293
See application file for complete search history.

(56) References Cited

U.S. PATENT DOCUMENTS

| | | | |
|---|---|---|---|
| 5,517,340 A | 5/1996 | Doany et al. | |
| 5,805,243 A * | 9/1998 | Hatano et al. | 349/5 |
| 5,967,636 A * | 10/1999 | Stark et al. | 353/84 |
| 8,408,708 B2 * | 4/2013 | Sharp | 353/7 |
| 8,801,192 B2 * | 8/2014 | Wang et al. | 353/84 |
| 2009/0309959 A1 | 12/2009 | Iwai et al. | |
| 2011/0199580 A1 * | 8/2011 | Hirata et al. | 353/31 |

FOREIGN PATENT DOCUMENTS

| | | |
|---|---|---|
| JP | A-8-248378 | 9/1996 |
| JP | A-2004-94175 | 3/2004 |
| JP | A-2007-271828 | 10/2007 |
| JP | A-2009-300914 | 12/2009 |

* cited by examiner

*Primary Examiner* — Sultan Chowdhury
(74) *Attorney, Agent, or Firm* — Oliff PLC (57) ABSTRACT

A projection system includes a projector body including a projection lens that projects image light, a color wheel located in a position downstream of the projection lens, a lens moving section that moves the projection lens from an initial position in at least one of an X direction and a Y direction, a movement amount detection unit that detects the amount of movement of the projection lens and the position to which the projection lens has been moved, an adjustment section that changes the position and the attitude of the color wheel, and an adjustment controller that controls the adjustment section in accordance with a detection result from the movement amount detection unit to adjust at least one of the position and the attitude of the color wheel.

11 Claims, 5 Drawing Sheets

PROJECTION SYSTEM

BACKGROUND

1. Technical Field

The present invention relates to a projection system.

2. Related Art

There is a known projector of related art that projects an image on a screen (see JP-A-2004-94175, for example).

The projector described in JP-A-2004-94175 includes an optical unit formed of a liquid crystal panel as a light modulator that modulates a light flux having exited out of a light source apparatus to form an optical image corresponding to image information and a projection lens that projects the optical image. The projector is further provided with an optical filter in a position downstream of the projection lens, and the optical filter reflects part of green light to improve sharpness of the projected image.

Some projectors are capable of adjusting the position where an image is projected and the factor at which the image is enlarged/reduced by moving a projection lens itself in a direction perpendicular to the optical axis of the projection lens and moving a zoom lens in the projection lens along the optical axis.

When a projector of this type is provided with the optical filter described in JP-A-2004-94175 as a member separate from the projection lens, the movement of the projection lens displaces the positions of the projection lens and the optical filter from each other, causing a problem of inappropriate light incidence on the optical filter.

SUMMARY

An advantage of some aspects of the invention is to provide a projection system that allows appropriate light incidence on an optical filter located in a position downstream of a lens.

A projection system according to a first aspect of the invention includes a projector body including a projection lens that projects an image, an optical filter located in a position downstream of the projection lens, a lens moving section that moves the projection lens from an initial position in a first direction perpendicular to the optical axis of the projection lens, a movement amount detector that detects at least one of the amount of movement of the projection lens from the initial position and the position to which the projection lens has been moved from the initial position, a filter adjuster that changes at least one of the position and the attitude of the optical filter, and an adjustment controller that controls the filter adjuster in accordance with a detection result from the movement amount detector to adjust at least one of the position and the attitude of the optical filter.

In the first aspect of the invention, the filter adjuster, which changes at least one of the position and the attitude of the optical filter, is provided, and the adjustment controller adjusts at least one of the position and the attitude of the optical filter in accordance with at least one of the following values detected by the movement amount detector: the amount of movement of the projection lens; and the position to which the projection lens has been moved. The attitude of the optical filter described in the first aspect of the invention refers to inclination of the light incident surface of the optical filter with respect to the optical axis of the projection lens.

In the configuration described above, even when the projection lens is moved from a predetermined initial position in the first direction, the optical filter can be moved in accordance with the position of the projection lens, whereby the light projected through the projection lens is allowed to be appropriately incident on the optical filter.

In the projection system according to the first aspect of the invention, it is preferable that the filter adjuster includes a position adjustment section that adjusts the position of the optical filter by moving the optical filter in the first direction.

In this configuration, the filter adjustor includes the position adjustment section that moves the optical filter in the first direction. The optical filter can therefore be moved in the same direction as the direction in which the projection lens is moved, whereby the light projected through the projection lens is reliably allowed to be incident on the optical filter.

In the projection system according to the first aspect of the invention, it is preferable that the filter adjuster includes an attitude adjustment section that adjusts the attitude of the optical filter by causing the optical filter to pivot around an axis perpendicular to the optical axis of the projection lens and the first direction.

In this configuration, the attitude adjustment section in the filter adjuster causes the optical filter to pivot around an axis perpendicular to the optical axis of the projection lens and the first direction. As a result, even when the projection lens is moved in the first direction and hence the traveling direction of the light that exits out of the projection lens changes, the light incident surface of the optical filter can be so changed that the light incident surface and the light traveling direction form a predetermined angle. Therefore, even when an optical filter having high dependence on the angle of incidence is used, image degradation due to a change in the angle between the optical axis of the projection lens and the optical filter will not occur.

A projection system according to a second aspect of the invention includes a projector body including a projection lens that projects an image, the projection lens including a zoom lens that moves from an initial position along the optical axis of the projection lens to enlarge/reduce the projected image, an optical filter located in a position downstream of the projection lens, a movement amount detector that detects at least one of the amount of movement of the zoom lens from the initial position and the position to which the zoom lens has been moved from the initial position, a filter adjuster that changes at least one of the position and the attitude of the optical filter, and an adjustment controller that controls the filter adjuster in accordance with a detection result from the movement amount detector to adjust at least one of the position and the attitude of the optical filter.

In the second aspect of the invention, the filter adjuster, which changes one of the position and the attitude of the optical filter, is provided, and the adjustment controller adjusts at least one of the position and the attitude of the optical filter in accordance with at least one of the following values detected by the movement amount detector: the amount of movement of the zoom lens; and the position to which the zoom lens has been moved. The attitude of the optical filter described in the second aspect of the invention refers to inclination of the light incident surface of the optical filter with respect to the optical axis of the projection lens, as in the first aspect described above.

In the configuration described above, even when the projection lens is moved from a predetermined initial position along the optical axis of the projection lens and hence the angle of view of the projected light changes, the light projected through the projection lens is allowed to be appropriately incident on the optical filter by moving the optical filter.

In the projection system according to the second aspect of the invention, it is preferable that the filter adjuster includes a position adjustment section that adjusts the position of the optical filter by moving the optical filter along the optical axis of the projection lens.

In this configuration, the filter adjuster includes the position adjustment section, which moves the optical filter along the optical axis of the projection lens. Since moving the zoom lens changes the angle of view, zooming an image may cause part of the light having exited out of the projection lens to spread beyond the optical filter in some cases, for example, if the distance between the projection lens and the optical filter is fixed. In contrast, in the configuration described above, the position adjustment section moves the optical filter in the direction along the optical axis of the projection lens to move the optical filter in such a way that the light having exited out of the projection lens does not spread beyond the optical filter.

In the projection system according to the first and second aspects of the invention, it is preferable that the projector body alternately forms a first image and a second image and projects the first image and the second image through the projection lens, and that the optical filter is a filter that separates the first image and the second image from each other.

In this configuration, the projector body alternately forms the first image and the second image and projects them through the projection lens. Further, out of the images projected from the projection lens, the optical filter has a first area that extracts the first image and a second area that extracts the second image.

In the thus configured projection system, for example, extracting a P-polarized-light image through the first area and extracting an S-polarized-light image through the second area allow the first image having passed through the first area and the second image having passed through the second area to be alternately displayed and used, for example, to form a stereoscopic image.

In the projection system according to the first and second aspects of the invention, it is preferable that the optical filter includes a color wheel that has a first area and a second area that transmit light fluxes having wavelengths different from each other and separates the first image and the second image from each other based on wavelength separation method and a rotator that rotates the color wheel around a central axis along the optical axis, and that a red transmission wavelength band, a green transmission wavelength band, and a blue transmission wavelength band formed in the first area differ from a red transmission wavelength band, a green transmission wavelength band, and a blue transmission wavelength band formed in the second area in terms of transmission wavelength.

In this configuration, for example, the first image, which is an image for the left eye, and the second image, which is an image for the right eye, are formed in the projector body, and the first image and the second image can be separated from each other and alternately displayed by rotating the color wheel.

Further, in such a color wheel for forming a stereoscopic image, its transmission wavelength bands disadvantageously change if the color wheel has high dependence on wavelength and the attitude of the color wheel is not maintained perpendicular to the optical axis of the projection lens. Moreover, when the projection lens is moved and hence the light incident area on the color wheel changes, the image formation timing at which the first image and the second image are formed in the projector body deviates from the separation timing at which the first image and the second image are separated from each other by the color wheel. Therefore, if the position and the attitude of the color wheel are not appropriately controlled, one of the first image and the second image contaminates the other image, and the viewer views the contaminated image or what is called crosstalk occurs in some cases.

In contrast, in the aspects of the invention, the position and the attitude of the color wheel can be appropriately controlled in accordance with the direction and amount of movement of the projection lens, as described above. As a result, the image formation timing and the image separation timing will not deviate from each other or the wavelength shift due to the inclination of the color wheel will not occur, whereby the amount of crosstalk can be reduced and the viewer can view an appropriate stereoscopic image.

In the projection system according to the first and second aspects of the invention, it is preferable that the rotator rotates the color wheel in such a way that light incident on the color wheel during a first image formation period when the first image is formed is incident on the first area and light incident on the color wheel during a second image formation period when the second image is formed is incident on the second area.

In this configuration, during the period when light corresponding to the first image is projected through the projection lens, the color wheel extracts the first image, whereas during the period when light corresponding to the second image is projected through the projection lens, the color wheel extracts the second image. That is, the image formation timing at which the first image and the second image are formed and the separation timing at which the first image and the second image are separated from each other by the color wheel are synchronized with each other. Therefore, the first area can properly extract the first image and the second area can properly extract the second image, whereby a proper stereoscopic image can be displayed and the viewer can view a sharp stereoscopic image.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the drawings.

Figure 1:
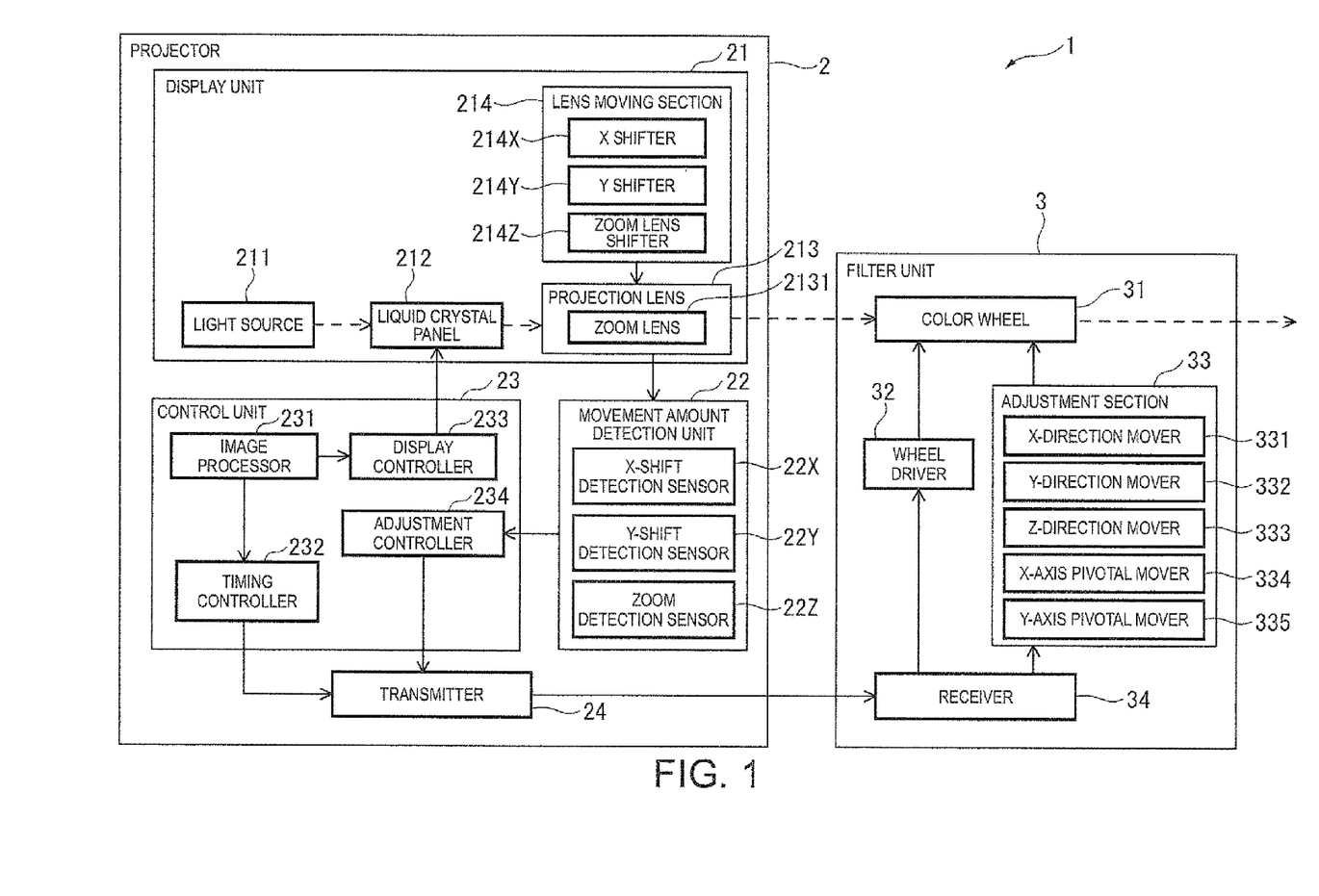
FIG. 1 is a block diagram showing a schematic configuration of a projection system according to an embodiment.

FIG. 1 is a block diagram showing a schematic configuration of a projection system 1 according to the present embodiment.

The projection system 1 according to the present embodiment includes a projector 2 (projector body) and a filter unit 3, which is detachably attached to the projector 2.

The projection system 1 can switch its display state between a state in which a two-dimensional image is displayed and a state in which an image for the right eye and an image for the left eye that are parallax images are alternately formed to display an image that allows stereoscopic vision based on the parallax (hereinafter referred to as a three-dimensional image in some cases).

When the projection system 1 is used to display a two-dimensional image, the filter unit 3 is removed from the projector 2. Light having exited out of the projector 2 is therefore directly projected on a screen, and a two-dimensional image is displayed.

On the other hand, when the projection system 1 is used to display a three-dimensional image on the screen, the filter unit 3 is attached to the projector 2, and the projector 2 alternately projects an image for the right eye and an image for the left eye. The filter unit 3 separates the image for the right eye and the image for the left eye incident thereon from each other and alternately transmits the images. As a result, the image for the right eye and the image for the left eye are switched one from the other and alternately displayed on the screen in a cycle of a predetermined period, and a viewer who wears glasses that will be described later can view a stereoscopic image. The image for the left eye and the image for the right eye correspond to a first image and a second image, respectively, according to the invention.

Configuration of Projector 2

The projector 2 includes a display unit 21, a movement amount detection unit 22, a control unit 23, and a transmitter 24, as shown in FIG. 1. In addition to the components described above, the projector 2 further includes, although not shown, a power supply apparatus that supplies electronic parts that form the projector 2 with electric power and a cooling apparatus that cools components to be cooled.

The display unit 21 forms and projects an image according to a drive signal inputted from the control unit 23. The display unit 21 includes a light source 211, a liquid crystal panel 212, a projection lens 213, and a lens moving section 214.

The light source 211 illuminates an image formation area of the liquid crystal panel 212. The light source 211 can be formed of a light source lamp, such as an ultra-high pressure mercury lamp, and a reflection mirror that reflects light fluxes emitted from the light source lamp with the traveling directions of the light fluxes aligned each other. The light source 211 can alternatively be formed of an LED (light emitting diode), an LD (laser diode), or any other solid-state light source.

The liquid crystal panel 212 is a light modulator that is driven in accordance with the drive signal described above to modulate the light incident from the light source 211. To form a three-dimensional image, the liquid crystal panel 212 alternately forms an image for the right eye and an image for the left eye that are parallax images under the control of the control unit 23.

The projection lens 213 is a projection optical apparatus that enlarges and projects an image formed by the liquid crystal panel 212 on a projection surface of the screen. The projection lens 213 can, for example, be a combination lens formed of a lens barrel and a plurality of lenses arranged in the lens barrel. As one of the plurality of lenses, the projection lens 213 includes a zoom lens 2131, which enlarges/reduces an image incident thereon and projects the resultant image on the projection surface, and the zoom lens 2131 moves forward and backward along the optical axis of the projection lens 213.

The lens moving section 214 moves the projection lens 213 in an X direction perpendicular to the optical axis of the projection lens 213 (right-left direction) and in a Y direction perpendicular to the optical axis and the X direction (up-down direction) to adjust the position where an image is projected. Further, the lens moving section 214 moves the zoom lens 2131 in the projection lens 213 in a Z direction along the optical axis of the projection lens 213 to enlarge/reduce an image to be projected.

That is, the lens moving section 214 includes an X shifter 214X, which moves the projection lens 213 in the X direction, a Y shifter 214Y, which moves the projection lens 213 in the Y direction, and a zoom lens shifter 214Z, which moves the zoom lens 2131 in the Z direction, as shown in FIG. 1.

When the lens moving section 214 moves the projection lens 213 upward (in +Y direction) from an initial position, an image displayed on the screen is moved upward from the position of an image displayed when the projection lens 213 is located in the initial position (a substantially central position in a movable range of the projection lens 213 along the Y and X axes). Similarly, when the projection lens 213 is moved downward (in −Y direction) from the initial position, an image displayed on the screen is moved downward from the position of an image displayed when the projection lens 213 is located in the initial position.

When the projection lens 213 is moved leftward (+X direction) from the initial position, an image displayed on the screen is moved leftward from the position of an image displayed when the projection lens 213 is located in the initial position. Similarly, when the projection lens 213 is moved rightward (−X direction) from the initial position, an image displayed on the screen is moved rightward from the position of an image displayed when the projection lens 213 is located in the initial position.

Further, when the lens moving section 214 moves the zoom lens 2131 in such a way that an image is enlarged, the angle of view increases and an image display area that occupies the screen increases accordingly. On the other hand, when the zoom lens 2131 is so moved that an image is reduced, the angle of view decreases and the display area that occupies the screen decreases accordingly.

The lens moving section 214, the configuration of which is not limited to a specific one, can be formed, for example, of an X-axis guide and a Y-axis guide that hold the projection lens 213 movably in the X and Y directions and stepper motors each of which supplies a drive force that drives the projection lens 213. In the lens moving section 214 in this example, the stepper motor corresponding to each of the axes is driven by a predetermined amount based on a lens drive signal from the control unit 23 to move the projection lens 213 in the corresponding direction. The zoom lens 2131 can be similarly moved, for example, by providing the following components in the projection lens 213: a Z guide along which the zoom lens 2131 is moved in the Z direction and a stepper motor that is driven based on the lens drive signal to move the zoom lens 2131 in the Z direction.

In the example described above, the projection lens 213 is moved by the drive force produced by each of the stepper motors based on the lens drive signal from the control unit 23. Alternatively, an operator may, for example, directly move the projection lens 213.

When the projection lens 213 is moved from a predetermined initial position at least in one of the X and Y directions, the movement amount detection unit 22 (movement amount detector) detects the direction and amount of movement of the projection lens 213. Further, when an image is enlarged/reduced, the movement amount detection unit 22 detects the side toward which the zoom lens 2131 is moved in the Z direction ("+" or "−" side) and the amount of movement of the zoom lens 2131.

That is, the movement amount detection unit 22 includes an X-shift detection sensor 22X, which detects the amount of movement of the projection lens 213 in the X direction, and a Y-shift detection sensor 22Y, which detects the amount of shift of the projection lens 213 in the Y direction. The movement amount detection unit 22 further includes a zoom detection sensor 22Z, which detects the amount of movement of the zoom lens 2131 in the Z direction. Each of the sensors 22X, 22Y, and 22Z outputs a detected amount of movement to the control unit 23.

In the present embodiment, each of the sensors 22X, 22Y, and 22Z may detect an actual amount of movement of the projection lens 213 or the zoom lens 2131. For example, when the projection lens 213 and the zoom lens 2131 are moved by a drive force produced by a stepper motor, each of the sensors may detect the amount of drive operation performed by the stepper motor. Still alternatively, the amount of movement of each of the projection lens 213 and the zoom lens 2131 may be detected by detecting the lens drive signal outputted from the control unit 23 to the lens moving section 214.

The control unit 23 not only controls the action of the entire projector 2 including the display unit 21 but also controls the action of the filter unit 3 by transmitting a timing signal representing an image formation timing at which a first image and a second image are formed and signals that instruct to change the position and the attitude of a color wheel 31 in accordance with the amount of movement of the projection lens 213. The control unit 23 is formed of a circuit substrate on which a CPU (central processing unit), a ROM (read only memory), a RAM (random access memory), and other components are mounted.

The control unit 23, in which the CPU executes a program stored in the ROM, functions as an image processor 231, a timing controller 232, a display controller 233, and an adjustment controller 234.

The ROM in the control unit 23 further stores a lookup table showing the relationship of the amounts of movement (amounts of movement in X, Y, and Z directions) and inclination angles (X-axis and Y-axis pivotal angles) of the color wheel 31 in the filter unit 3 versus the amount of movement of the projection lens 213 in the X direction (X-shift amount), the amount of movement of the projection lens 213 in the Y direction (Y-shift amount), and the amount of movement of the zoom lens 2131 in the Z direction (zoom amount).

The image processor 231 processes externally received image data (including image signal) and draws an image corresponding to a single screen in a frame memory (not shown) based on the image data. When the image data include three-dimensional image data, the three-dimensional image data contain left-eye image data for an image for the left eye and right-eye image data for an image for the right eye. Each block of the image data is formed of a set of data on a frame basis and also contains sync signals (vertical sync signal and horizontal sync signal).

The timing controller 232 reads the sync signals contained in the image data processed by the image processor and synchronizes the display controller 233, the transmitter 24, and hence the filter unit 3 with each other.

The display controller 233 reads the image drawn by the image processor 231 as appropriate and successively drives the liquid crystal panel 212 to form the image.

Specifically, the display controller 233 sequentially selects a scan line from those in the liquid crystal panel 212, from the uppermost scan line (scan line selected first) to the lowermost scan line (scan line selected last), within a vertical scan period based on the sync signals inputted from the timing controller 232 and applies a voltage to each pixel connected to the selected scan line, the voltage according to the grayscale of the pixel, via a signal line (writes image data) to update the image formed in the liquid crystal panel 212. The display controller 233 then carries out the same process in the following vertical scan period to update the image to the following image. In this process, to form a three-dimensional image, the display controller 233 alternately reads an image for the right eye and an image for the left eye drawn by the image processor 231 and instructs the liquid crystal panel 212 to alternately form the image for the right eye and the image for the left eye.

The adjustment controller 234 generates an adjustment control signal in accordance with which the position and the attitude of the color wheel 31 in the filter unit 3 are changed and outputs the adjustment control signal via the transmitter 24.

Specifically, the adjustment controller 234 refers to the lookup table stored in the ROM and reads the amount of movement of the color wheel 31 in the X-axis direction, the amount of movement thereof in the Y-axis direction, the amount of movement thereof in the Z-axis direction, the amount of pivotal movement thereof around the X axis, and the amount of pivotal movement thereof around the Y axis corresponding to the X-shift amount, the Y-shift amount, and the zoom amount measured from the initial position of the projection lens 213 and detected by the movement amount detection unit 22. The adjustment controller 234 then generates an adjustment control signal in accordance with which the position and the attitude of the color wheel 31 are changed by the read amounts of movement along the axes and the read amounts of pivotal movement around the axes.

The transmitter 24 transmits the timing signals and the adjustment control signal described above.

Specifically, the transmitter 24 transmits the following timing signals at timings based on the vertical sync signal inputted from the timing controller 232 (image formation timing): a timing signal representing a timing at which the filter unit 3 forms an image for the right eye; and a timing signal representing a timing at which the filter unit 3 forms an image for the left eye.

Further, when the adjustment controller 234 generates the adjustment control signal, the transmitter 24 transmits the generated adjustment control signal to the filter unit 3.

Configuration of Filter Unit 3

The filter unit 3, which is disposed in a position on the optical path of image light projected from the projector 2, separates the image light into an image for the right eye and an image for the left eye and transmits the separated images. The filter unit 3 includes the color wheel 31, a wheel driver 32 (rotator), an adjustment section 33 (filter adjuster), and a receiver 34.

Figure 2:
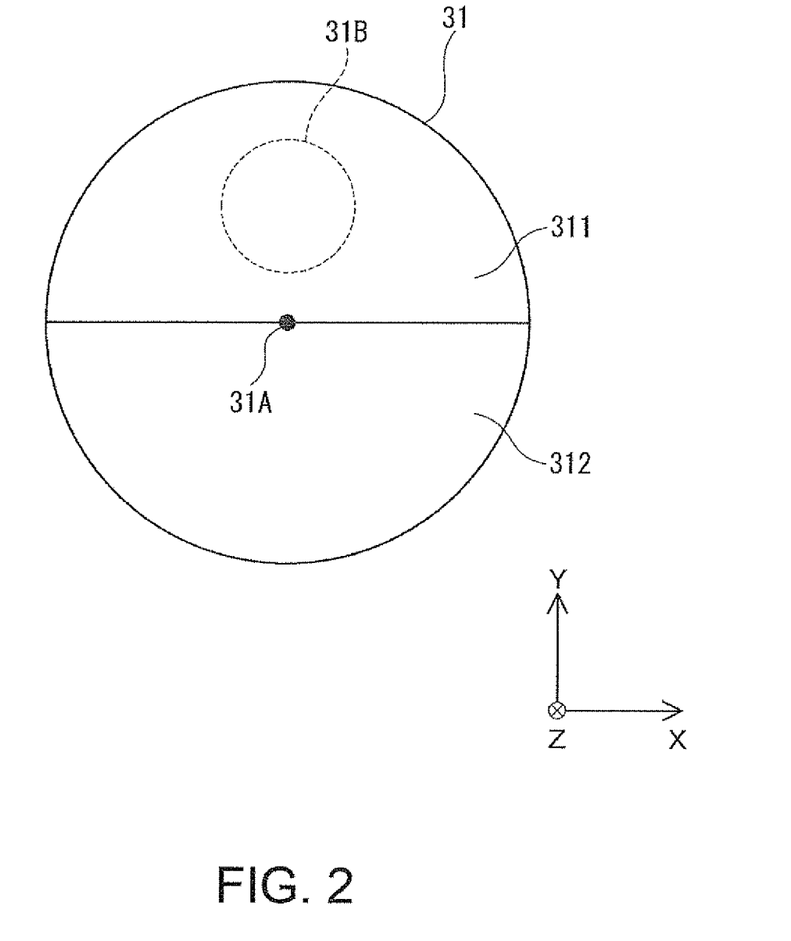
FIG. 2 is a diagrammatic view showing a schematic configuration of a color wheel in the embodiment.

FIG. 2 is a diagrammatic view showing a schematic configuration of the color wheel 31.

The color wheel 31 is a disc-shaped optical member held rotatably around an axis of rotation 31A located at a central point of the disc shape in the plan view as shown in FIG. 2, and the color wheel 31 is formed by stacking a plurality of bandpass filters. The adjustment section 33, which will be described later, orients the axis of rotation 31A in the direction along the central axis of the light (image) projected through the projection lens 213.

Figure 3:
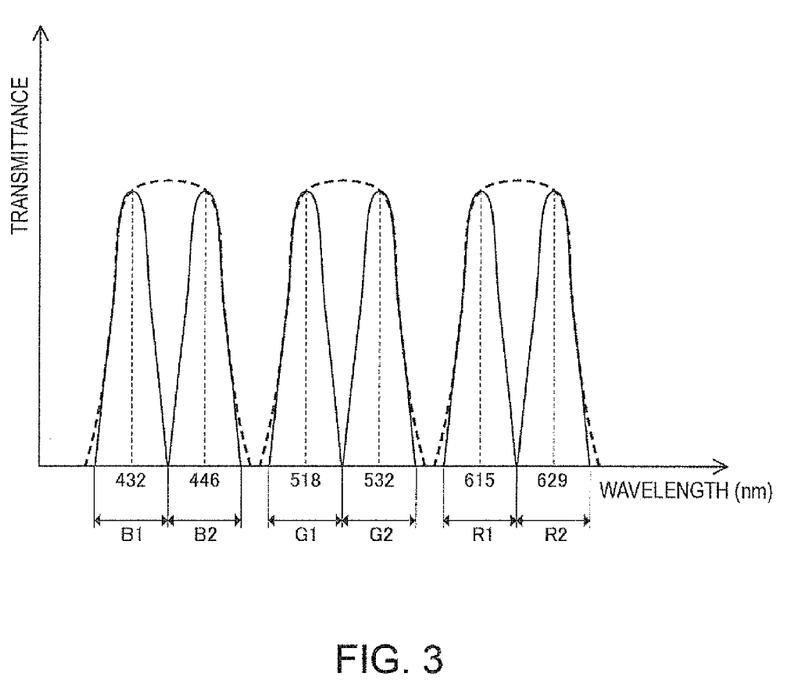
FIG. 3 shows transmission wavelength bands of light fluxes separated by the color wheel in the embodiment.

FIG. 3 shows transmission wavelength bands of the light fluxes separated by the color wheel 31.

The color wheel 31 has a first area 311, which extracts an image for the left eye, and a second area 312, which extracts an image for the right eye. The first area 311 and the second area 312, which are configured to transmit red light (R), green light (G), and blue light (B), transmit the color light fluxes that belong to transmission wavelength bands different from each other.

That is, the first area 311 transmits red light in a transmission wavelength band R1 having a predetermined width around, for example, 615 nm, and the second area 312 transmits red light in a transmission wavelength band R2 having a predetermined width around, for example, 629 nm, as shown in FIG. 3.

Further, the first area 311 transmits green light in a transmission wavelength band G1 having a predetermined width around, for example, 518 nm, and the second area 312 transmits green light in a transmission wavelength band G2 having a predetermined width around, for example, 532 nm.

Similarly, the first area 311 transmits blue light in a transmission wavelength band B1 having a predetermined width around, for example, 432 nm, and the second area 312 transmits blue light in a transmission wavelength band B2 having a predetermined width around, for example, 446 nm.

The receiver 34 receives the timing signals and the adjustment control signal transmitted from the projector 2. The timing signals received by the receiver 34 are outputted to the wheel driver 32, and the adjustment control signal received by the receiver 34 is outputted to the adjustment section 33. The connection between the receiver 34 and the transmitter 24 may be wireless connection based, for example, on a radio wave or infrared light or may be wired connection using, for example, a cable line.

The wheel driver 32 rotates the color wheel 31 around the axis of rotation 31A at a predetermined rotating speed.

The wheel driver 32 controls the rotary drive of the color wheel 31 based on the timing signals transmitted from the projector 2. That is, the timing at which the color wheel 31 is rotated and the timing at which the projector 2 forms images are so synchronized with each other that at the timing when an image for the left eye is projected through the projection lens 213 of the projector 2, the image for the left eye is incident on the first area 311 and at the timing when an image for the right eye is projected through the projection lens 213, the image for the right eye is incident on the second area 312.

The adjustment section 33 changes the position and the attitude of the color wheel 31 in accordance with the adjustment control signal transmitted from the projector 2.

Specifically, the adjustment section 33 includes an X-direction mover 331, a Y-direction mover 332, a Z-direction mover 333, an X-axis pivotal mover 334, and a Y-axis pivotal mover 335, as shown in FIG. 1.

When the adjustment control signal contains an amount of movement in the X direction, the X-direction mover 331 moves the color wheel 31 based on the amount of movement in the X direction (+X or −X direction).

When the adjustment control signal contains an amount of movement in the Y direction, the Y-direction mover 332 moves the color wheel 31 based on the amount of movement in the Y direction (+Y or −Y direction).

When the adjustment control signal contains an amount of movement in the Z direction, the Z-direction mover 333 moves the color wheel 31 based on the amount of movement in the Z direction (+Z or −Z direction).

When the adjustment control signal contains an amount of pivotal movement around the X axis, the X-axis pivotal mover 334 causes the color wheel 31 to pivot around the X axis based on the amount of pivotal movement. That is, the X-axis pivotal mover 334 causes the axis of rotation 31A of the color wheel 31 to pivot in the YZ plane.

When the adjustment control signal contains an amount of pivotal movement around the Y axis, the Y-axis pivotal mover 335 causes the color wheel 31 to pivot around the Y axis based on the amount of pivotal movement. That is, the Y-axis pivotal mover 335 causes the axis of rotation 31A of the color wheel 31 to pivot in the XZ plane.

That is, the X-direction mover 331, the Y-direction mover 332, the Z-direction mover 333 form a position adjustment section according to the invention, and the X-axis pivotal mover 334 and the Y-axis pivotal mover 335 form an attitude adjustment section according to the invention.

Action of Projection System

Control of Filter Unit 3 when Projection Lens 213 is Moved

A description will next be made of control of the color wheel 31 in the filter unit 3 in a case where the lens moving section 214 moves the projection lens 213 at least in one of the X direction and the Y direction in the projection system 1 described above.

Figure 4:
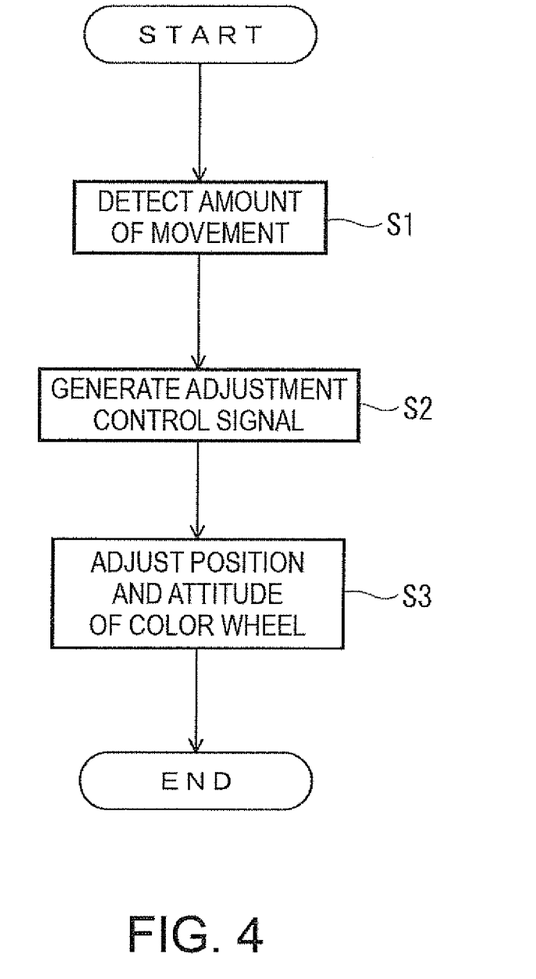
FIG. 4 is a flowchart showing the action of the projection system according to the embodiment performed when a projection lens is moved.

FIG. 4 is a flowchart showing the action of the projection system 1 according to the present embodiment performed when the projection lens 213 is moved.

When the lens moving section 214 moves the projection lens 213, the movement amount detection unit 22 first detects the amount of movement of the projection lens 213 (step S1), as shown in FIG. 4.

That is, when the projection lens 213 is moved from a predetermined initial lens position by a predetermined amount in the X direction, the X-shift detection sensor 22X detects the amount of movement from the initial lens position in the X direction. When the projection lens 213 is moved from the initial lens position in the Y direction, the Y-shift detection sensor 22Y detects the amount of movement from the initial lens position in the Y direction.

The adjustment controller 234 then refers to the lookup table stored in the ROM, acquires the amount of adjustment of the color wheel 31 (amount of movement in X direction, amount of movement in Y direction, amount of pivotal movement around X axis, and amount of pivotal movement around Y axis) corresponding to the direction and amount of movement of the projection lens 213 detected in step S1, and generates an adjustment control signal in accordance with which at least one of the position and the attitude of the color wheel 31 is adjusted by the amount of adjustment (step S2).

The adjustment controller 234 then transmits the signal generated in step S2 to the filter unit 3 via the transmitter 24.

On the other hand, upon receiving the adjustment control signal transmitted from the projector 2 via the receiver 34, the filter unit 3 outputs the adjustment control signal to the adjustment section 33.

The adjustment section 33 then drives the X-direction mover 331, the Y-direction mover 332, the X-axis pivotal mover 334, and the Y-axis pivotal mover 335 based on the inputted adjustment control signal to adjust the position and the attitude of the color wheel 31 (step S3).

Based on the action described above, even when the projection lens 213 is moved, the position and the attitude of the color wheel 31 are so adjusted that the light projected through the projection lens 213 is incident on a predetermined light incident area 31B (see FIG. 2) on the color wheel 31.

The adjustment of the position and the attitude of the color wheel 31 in steps S1 to S3 described above will be described below in more detail with reference to a case where the projection lens 213 is moved in the +Y direction.

Figure 5:
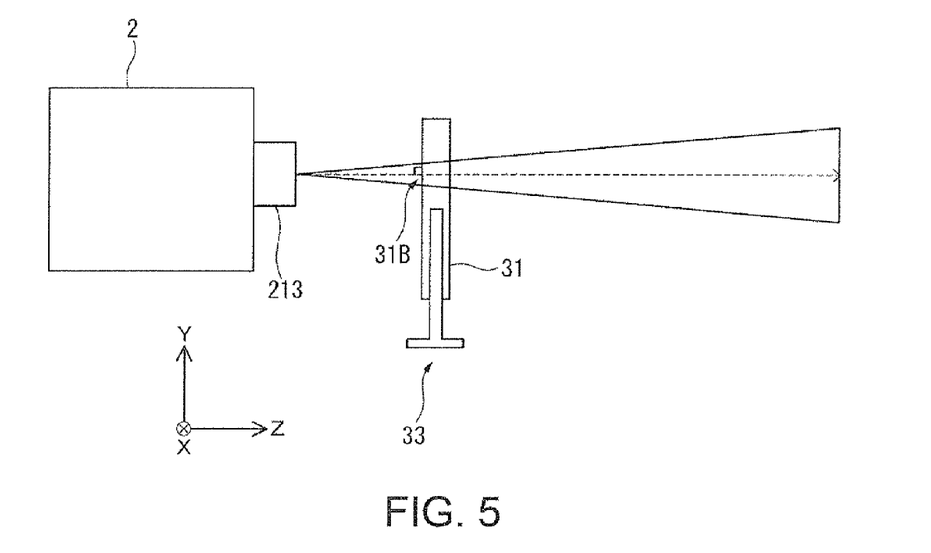
FIG. 5 describes control of the color wheel performed when the projection lens is moved in a Y-axis direction in the embodiment.
Figure 6:
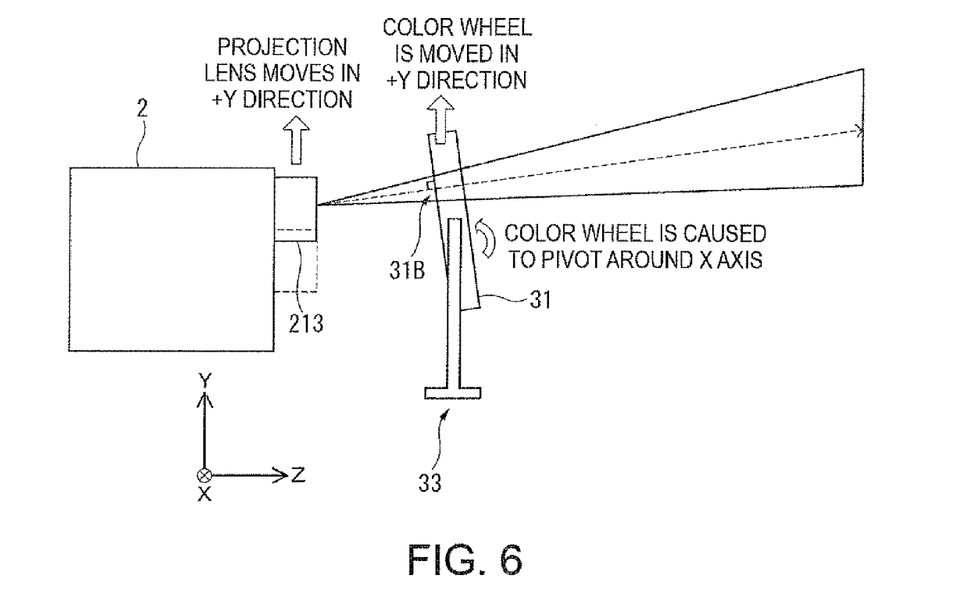
FIG. 6 describes control of the color wheel performed when the projection lens is moved in the Y-axis direction in the embodiment.

FIGS. 5 and 6 describe the control of the color wheel 31 performed when the projection lens 213 is moved in the Y direction in the present embodiment. FIG. 5 shows the positions of the projection lens 213 and the color wheel 31 in an initial state in which the optical axis of the projection lens 213 coincides with the central axis of the liquid crystal panel 212, and FIG. 6 shows the positions of the projection lens 213 and the color wheel 31 after the projection lens 213 is moved so that the optical axis of the projection lens 213 is shifted from the central axis of the liquid crystal panel 212.

When the projection lens 213 is moved from the initial lens position in the +Y direction, the optical axis of the projection lens 213 is also moved in the +Y direction, as shown in FIGS. 5 and 6. Further, when the projection lens 213 is moved in the +Y direction, the direction in which the light from the liquid crystal panel 212 travels is changed by the projection lens 213 and inclined toward the +Y side.

In this state, if the color wheel 31 is not moved relative to the projection lens 213, part of the light projected through the projection lens 213 is not incident on the color wheel 31 in some cases. In this case, part of the image for producing stereoscopic vision does not pass through the color wheel 31, and an image for the left eye and an image for the right eye that are not separated from each other are displayed on the screen, resulting in improper three-dimensional image display.

Further, when the position of the light incident area 31B on the color wheel 31 changes, the image formation timing at which an image for the left eye and an image for the right eye are formed in the projector 2 does not coincide with the image separation timing at which the image for the left eye and the image for the right eye are separated from each other by the color wheel 31 in some cases. In this case, for example, the image for the left eye formed in the projector 2 is disadvantageously incident on the second area 312 of the color wheel 31 (undergoes separation based on the transmission wavelength band for the image for the right eye), resulting in crosstalk.

Further, when the traveling direction of the light projected through the projection lens 213 is inclined, the angle of incidence of the projected light incident on the color wheel 31 changes, which changes the transmission wavelength bands in the first area 311 and the second area 312. In this case, crosstalk and other problems also occur, resulting in a difficulty displaying an appropriate image.

In contrast, in the present embodiment, in which steps S1 to S3 described above are carried out so that the color wheel 31 is also moved in the +Y direction by the Y-direction mover 332, the light projected through the projection lens 213 is allowed to be incident on the predetermined light incident area 31B on the color wheel 31. That is, since the light incident area 31B on which the light projected through the projection lens 213 is incident on the color wheel 31 in the initial state does not change after the color wheel 31 is moved, the problems of unseparated images for the left and right eyes and crosstalk due to the discrepancy between the image formation timing and the image separation timing and other problems will not occur.

Further, even when the movement of the projection lens 213 inclines the traveling direction of the light projected through the projection lens 213 toward the +Y side, the X-axis pivotal mover 334 can maintain a substantially right angle between the traveling direction of the light and the light incident surface of the color wheel 31. As a result, the angle of incidence of the light incident on the color wheel 31 does not change, and hence no shift in each of the transmission wavelength bands occurs, whereby an image for the left eye and an image for the right eye can be properly separated from each other.

FIGS. 5 and 6 show the case where the projection lens 213 is moved in the Y direction by way of example, and the same holds true for a case where the projection lens 213 is moved in the X-axis direction. In this case, the X-direction mover 331 may control the position of the color wheel 31, and the Y-axis pivotal mover 335 may control the inclination angle of the color wheel 31.

Control of Filter Unit 3 Performed when Zoom Lens 2131 is Moved

A description will next be made of control of the color wheel 31 in the filter unit 3 performed when the lens moving section 214 moves the zoom lens 2131 in the projection lens 213 in the Z direction in the projection system 1 described above. In this case as well, the filter unit 3 is controlled based on substantially the same processes as those in the flowchart shown in FIG. 4.

That is, when the lens moving section 214 moves the zoom lens 2131 in order to enlarge/reduce an image, the zoom detection sensor 22Z in the movement amount detection unit 22 detects the amount and direction of the movement of the zoom lens 2131 in the process in step S1.

The adjustment controller 234 then carries out the process in step S2. That is, the adjustment controller 234 refers to the lookup table stored in the ROM, acquires the amount of adjustment of the color wheel 31 (amount of movement in Z direction) corresponding to the direction and amount of movement of the zoom lens 2131 detected in step S1, and generates an adjustment control signal in accordance with which the position of the color wheel 31 is adjusted by the amount of adjustment.

The adjustment controller 234 then transmits the generated signal to the filter unit 3 via the transmitter 24.

On the other hand, upon receiving the adjustment control signal transmitted from the projector 2 via the receiver 34, the filter unit 3 outputs the adjustment control signal to the adjustment section 33.

The adjustment section 33 then carries out the process in step S3 to drive the Z-direction mover 333 based on the inputted adjustment control signal to move the color wheel 31 in the Z direction.

Based on the action described above, even when the zoom lens 2131 is moved, the position of the color wheel 31 is so adjusted that the light projected through the projection lens 213 is not shifted beyond the color wheel 31 but is incident on the predetermined light incident area 31B.

In the above description, the control of the filter unit 3 performed when the projection lens 213 is moved in the X and Y directions and the control of the filter unit 3 performed when the zoom lens 2131 is moved in the Z direction are separately described. The two types of control operation may be simultaneously performed.

An image for the right eye and an image for the left eye displayed as described above are visually recognized as a three-dimensional image by using glasses provided with a filter for the right eye determined by the wavelengths that pass through the first area 311 and disposed in a position corresponding to the right eye of the viewer and a filter for the left eye determined by the wavelengths that pass through the second area 312 and disposed in a position corresponding to the left eye of the viewer.

That is, the image for the right eye passes through the filter for the right eye and is viewed with the right eye but does not pass through the filter for the left eye or is not viewed with the left eye. On the other hand, the image for the left eye passes through the filter for the left eye and is viewed with the left eye but does not pass through the filter for the right eye or is not viewed with the right eye. The image for the right eye and the image for the left eye are therefore viewed separately with the right eye and the left eye and hence can be visually recognized as a three-dimensional image.

The projection system 1 according to the present embodiment described above can provide the following advantageous effects.

The projection system 1 includes the projector 2, which projects light corresponding to image data through the projection lens 213, and the filter unit 3, which includes the color wheel 31, which is an optical filter that is detachably attached to the projector 2 and transmits the projected light. Further, the projector 2 is provided with the movement amount detection unit 22, which detects the amounts of movement of the projection lens 213 and the zoom lens 2131, and the adjustment controller 234 in the control unit 23 generates an adjustment control signal for moving the color wheel 31 based on the lookup table stored in the ROM and a detection result from the movement amount detection unit 22. The adjustment section 33 in the filter unit 3 then controls the position and the attitude of the color wheel 31 based on the adjustment control signal and in accordance with the amounts of movement of the projection lens 213 and the zoom lens 2131.

In the configuration described above, even when the projection lens 213 is moved, the light projected through the projection lens 213 will not be shifted beyond the color wheel 31, but passes through the color wheel 31 and is projected on the screen. Further, even when the zoom lens 2131 is moved to enlarge/reduce an image and hence the angle of view of the image projected through the projection lens 213 changes, the color wheel 31 is so moved in the Z direction that the projected light will not spread beyond the color wheel 31.

The position and the attitude of the color wheel 31 can therefore be appropriately controlled in accordance with the position of the projection lens 213, whereby an image for the left eye and an image for the right eye separated from each other by the color wheel 31 can be properly transmitted.

In the projection system 1 according to the present embodiment, the adjustment section 33 in the filter unit 3 includes the X-direction mover 331, which moves the color wheel 31 in the X direction, the Y-direction mover 332, which moves the color wheel 31 in the Y direction, and the Z-direction mover 333, which moves the color wheel 31 in the Z direction.

The color wheel 31 can therefore be moved, even when the projection lens 213 is moved in either the X or Y direction, based on the amount of movement in the X or Y direction. Further, the color wheel 31 can be moved in the Z direction in accordance with the amount of movement of the zoom lens 2131.

The light projected through the projection lens 213 is therefore allowed to be reliably incident on the color wheel 31, whereby an appropriate image corresponding to image data can be displayed on the screen.

Further, in the present embodiment, the adjustment section 33 further includes the X-axis pivotal mover 334 and the Y-axis pivotal mover 335.

Therefore, even when the projection lens 213 is moved in a direction perpendicular to the optical axis thereof and hence the traveling direction of the light projected through the projection lens 213 changes, the attitude of the color wheel 31 can be so changed that the color wheel 31 remains perpendicular to the traveling direction of the light. A substantially right angle between the light incident on the color wheel 31 and the light incident surface of the color wheel 31 can therefore be maintained, whereby image degradation due to the change in the angle of incidence of the light incident on the color wheel 31 will not occur.

Further, when the color wheel 31 is used as an optical filter and an image for the left eye and an image for the right eye are separated from a stereoscopic vision producing image projected from the projector 2 as in the present embodiment, inappropriate control of the position and the attitude of the color wheel 31 results in crosstalk. In contrast, in the present embodiment, the light projected through the projection lens 213 is reliably allowed to be incident on the light incident area 31B on the color wheel 31 as described above, whereby crosstalk due to discrepancy between the position of the projection lens 213 and the position of the color wheel 31 can be suppressed. Further, the attitude of the color wheel 31 can be so maintained that the light incident surface of the color wheel 31 remains perpendicular to the traveling direction of the light from the projection lens 213, as described above. As a result, the transmission wavelength bands of light fluxes that pass through the color wheel 31 will not be shifted, and crosstalk that occurs otherwise will not occur.

Further, in the present embodiment, to display a three-dimensional image, the projector 2 transmits a timing signal representing the image formation timing to the filter unit 3, and the wheel driver 32 rotates the color wheel 31 based on the timing signal in such a way that the timing at which an image for the left eye and an image for the right eye are separated from each other is synchronized with the image formation timing.

As a result, appropriate images for the left and right eyes can be alternately displayed on the screen, whereby the viewer can properly view a stereoscopic image.

Variations of Embodiment

The invention is not limited to the embodiment described above, and the invention encompasses variations, modification, and other changes to the extent that they achieve the advantage of the invention.

In the embodiment described above, the projector 2 and the filter unit 3 are separate apparatus. That is, to display a two-dimensional image, the filter unit 3 is removed from the projector 2, whereas to display a three-dimensional image, the filter unit 3 is attached to the projector 2. Alternatively, for example, the projector body and the optical filter may be integrated with each other. In this case, the optical filter and a filter driver that changes the position and the attitude of the optical filter may be provided in an enclosure that forms the projector.

In the embodiment described above, the control unit 23 in the projector 2 is provided with the adjustment controller 234, which transmits an adjustment control signal to the filter unit 3, but the invention is not necessarily configured this way. For example, the filter unit 3 may be provided with the adjustment controller. In this case, the direction and amount of movement of the projection lens 213 detected by the movement amount detection unit 22 are transmitted from the projector 2 to the filter unit 3, and the adjustment controller provided in the filter unit 3 controls the position and the attitude of the color wheel 31 based on the direction and amount of the movement.

In the embodiment described above, the position and the attitude of the color wheel 31 are controlled based on both the amounts of movement of the projection lens 213 in the X and Y directions and the amount of movement of the zoom lens 2131 in the Z direction, but the invention is not necessarily configured this way.

For example, the projector 2 may alternatively be so configured that the projection lens 213 is fixed with the optical axis of the projection lens 213 coinciding with the central axis of the liquid crystal panel 212 and the enlargement/reduction by the zoom lens 2131 can only be performed. In this case, the movement amount detection unit 22 may detect only the amount of movement of the zoom lens 2131 in the Z direction. Further, in this case, the adjustment section 33 may include only the Z-direction mover 333. The projector 2 may still alternatively be so configured that the projection lens 213 is fixed with the optical axis of the projection lens 213 shifted from the central axis of the liquid crystal panel 212 and the enlargement/reduction by the zoom lens 2131 can only be performed. In this case, the movement amount detection unit 22 may detect only the amount of movement of the zoom lens 2131 in the Z direction. Further, in this case, the adjustment section 33 may include only the Z-direction mover 333 and pivotal movers each having a pivotal axis perpendicular to the direction in which the optical axes of the projection lens 213 are shifted from the central axis of the liquid crystal panel 212 (corresponding to X-axis pivotal mover 334 and Y-axis pivotal mover 335 described above).

Similarly, the projector 2 may still alternatively be so configured that the projection lens 213 can be moved only in the X and Y directions, or the projector may even be so configured that the projection lens 213 can be moved only in the X or Y direction. In this case, the adjustment section 33 may be provided only with a mover corresponding to the direction in which the projection lens 213 is moved.

Further, the adjustment section 33 includes the X-axis pivotal mover 334 and the Y-axis pivotal mover 335 for changing the attitude of the color wheel 31, but the invention is not necessarily configured this way. For example, when a filter having low dependence on wavelength is used as the optical filter, the X-axis pivotal mover 334 and the Y-axis pivotal mover 335 may be omitted.

In the embodiment described above, an image for the right eye and an image for the left eye are separated from each other based on a wavelength separation method, and the viewer wears dedicated glasses used to view the images and provided with a filter for the left eye that transmits light that passes through the first area and blocks the other light and a filter for the right eye that transmits light that passes through the second area and blocks the other light, but the invention is not necessarily configured this way. That is, the projection system may alternatively be so configured that the color wheel described above is replaced with an optical filter provided with at least two types of wave plates as another optical filter that changes the polarization state of the incident light and the viewer wears polarization glasses provided with a filter for the right eye determined by the polarization state of light that passes through the first area 311 and disposed in a position corresponding to the right eye of the viewer and a filter for the left eye determined by the polarization state of light that passes through the second area 312 and disposed in a position corresponding to the left eye of the viewer. In this case, the rotary drive of the optical filter that changes the polarization state of the incident light may be controlled based on the timing signals transmitted from the projector 2. In the configuration described above, the image formation timing in the projector 2, the image separation timing in the filter unit 3, and the open/close timings of liquid crystal shutters of the glasses can be synchronized with each other, whereby the viewer can view a more appropriate stereoscopic image.

In the embodiment described above, the color wheel 31 is presented as the optical filter, but any other filter may be used in accordance with the purpose for which the projector 2 is used or other factors. Examples of the optical filter described above may include a polarizer that changes the polarization direction of light, a wave plate, and a cinema filter.

Further, the brightness of an image displayed on the screen may be detected with a photo-sensor, a CCD, or any other imaging sensor, and the position and the attitude of the optical filter may be automatically so moved that the detected brightness is improved.

The invention can be used as a projection system that displays an image in a display area on a screen or any other surface.

The entire disclosure of Japanese Patent Application No. 2012-171744, filed Aug. 2, 2012 is expressly incorporated by reference herein.

What is claimed is:

1. A projection system comprising:
a projector body including a projection lens that projects an image;
an optical filter located in a position downstream of the projection lens;
a lens moving section that moves the projection lens from an initial position in a first direction perpendicular to the optical axis of the projection lens;
a movement amount detector that detects at least one of the amount of movement of the projection lens from the initial position and the position to which the projection lens has been moved from the initial position;
a filter adjuster that changes at least one of the position and the attitude of the optical filter; and
an adjustment controller that controls the filter adjuster in accordance with a detection result from the movement amount detector to adjust at least one of the position and the attitude of the optical filter.

2. The projection system according to claim 1, wherein the filter adjuster includes a position adjustment section that adjusts the position of the optical filter by moving the optical filter in the first direction.

3. The projection system according to claim 1, wherein the filter adjuster includes an attitude adjustment section that adjusts the attitude of the optical filter by causing the optical filter to pivot around an axis perpendicular to the optical axis of the projection lens and the first direction.

4. The projection system according to claim 1, wherein the projector body alternately forms a first image and a second image and projects the first image and the second image through the projection lens, and the optical filter is a filter that separates the first image and the second image from each other.

5. The projection system according to claim 4, wherein the optical filter includes
a color wheel that has a first area and a second area that transmit light fluxes having wavelengths different from each other and separates the first image and the second image from each other based on wavelength separation method, and
a rotator that rotates the color wheel around a central axis along the optical axis, and
a red transmission wavelength band, a green transmission wavelength band, and a blue transmission wavelength band formed in the first area differ from a red transmission wavelength band, a green transmission wavelength band, and a blue transmission wavelength band formed in the second area in terms of transmission wavelength.

6. The projection system according to claim 5, wherein the rotator rotates the color wheel in such a way that light incident on the color wheel during a first image formation period when the first image is formed is incident on the first area and light incident on the color wheel during a second image formation period when the second image is formed is incident on the second area.

7. A projection system comprising: a projector body including a projection lens that projects an image, the projection lens including a zoom lens that moves from an initial position along an optical axis of the projection lens to enlarge/reduce the projected image; an optical filter located in a position downstream of the projection lens; a movement amount detector that detects at least one of the amount of movement of the zoom lens from the initial position and the position to which the zoom lens has been moved from the initial position; a filter adjuster that changes at least one of the position and the attitude of the optical filter; and an adjustment controller that controls the filter adjuster in accordance with a detection result from the movement amount detector to adjust at least one of the position and the attitude of the optical filter.

8. The projection system according to claim 7,
wherein the filter adjuster includes a position adjustment section that adjusts the position of the optical filter by moving the optical filter along the optical axis of the projection lens.

9. The projection system according to claim 7,
wherein the projector body alternately forms a first image and a second image and projects the first image and the second image through the projection lens, and
the optical filter is a filter that separates the first image and the second image from each other.

10. The projection system according to claim 9,
wherein the optical filter includes
a color wheel that has a first area and a second area that transmit light fluxes having wavelengths different from each other and separates the first image and the second image from each other based on wavelength separation method, and
a rotator that rotates the color wheel around a central axis along the optical axis, and
a red transmission wavelength band, a green transmission wavelength, band, and a blue transmission wavelength band formed in the first area differ from a red transmission wavelength band, a green transmission wavelength band, and a blue transmission wavelength band formed in the second area in terms of transmission wavelength.

11. The projection system according to claim 10,
wherein the rotator rotates the color wheel in such a way that light incident on the color wheel during a first image formation period when the first image is formed is incident on the first area and light incident on the color wheel during a second image formation period when the second image is formed is incident on the second area.

* * * * *